United States Patent [19]

Depew

[11] 4,166,449
[45] Sep. 4, 1979

[54] HEAT STORAGE VAULT

[76] Inventor: Walter L. Depew, 3111 W. 54th Ave., Denver, Colo. 80221

[21] Appl. No.: 852,417

[22] Filed: Nov. 17, 1977

Related U.S. Application Data

[62] Division of Ser. No. 572,083, Apr. 28, 1975, Pat. No. 4,064,865.

[51] Int. Cl.² .............................. F24H 7/00; F24J 3/02
[52] U.S. Cl. .................... 126/400; 126/436; 165/104 S
[58] Field of Search ............ 126/270, 271, 400; 165/DIG. 13, 104 S, 162, 164, 172; 62/2

[56] References Cited

U.S. PATENT DOCUMENTS

| | | | |
|---|---|---|---|
| 2,933,885 | 4/1960 | Benedek et al. | 237/1 A |
| 3,163,209 | 12/1964 | Shinn | 126/400 |
| 3,401,682 | 9/1968 | Jakob | 126/400 |
| 3,877,441 | 4/1975 | Mach et al. | 126/400 |
| 3,965,972 | 6/1976 | Peterson | 126/271 |

*Primary Examiner*—James C. Yeung
*Attorney, Agent, or Firm*—O'Rourke & Harris

[57] ABSTRACT

A heat storage vault in the form of an insulated enclosure having therein a plurality of serpentine pipes each with lengths extending back and forth within the enclosure with the lengths substantially equidistantly spaced both from the closest lengths of the common serpentine pipe and from the closest lengths of the other adjacent pipes, and a heat storage medium filling the enclosure and the space between the serpentine pipes and adapted to receive heat from at least one of the serpentine pipes when a heated fluid is conducted therethrough, store the heat within the heat storage medium, and provide heat to at least one other of the serpentine pipes as a fluid is circulated therethrough.

3 Claims, 3 Drawing Figures

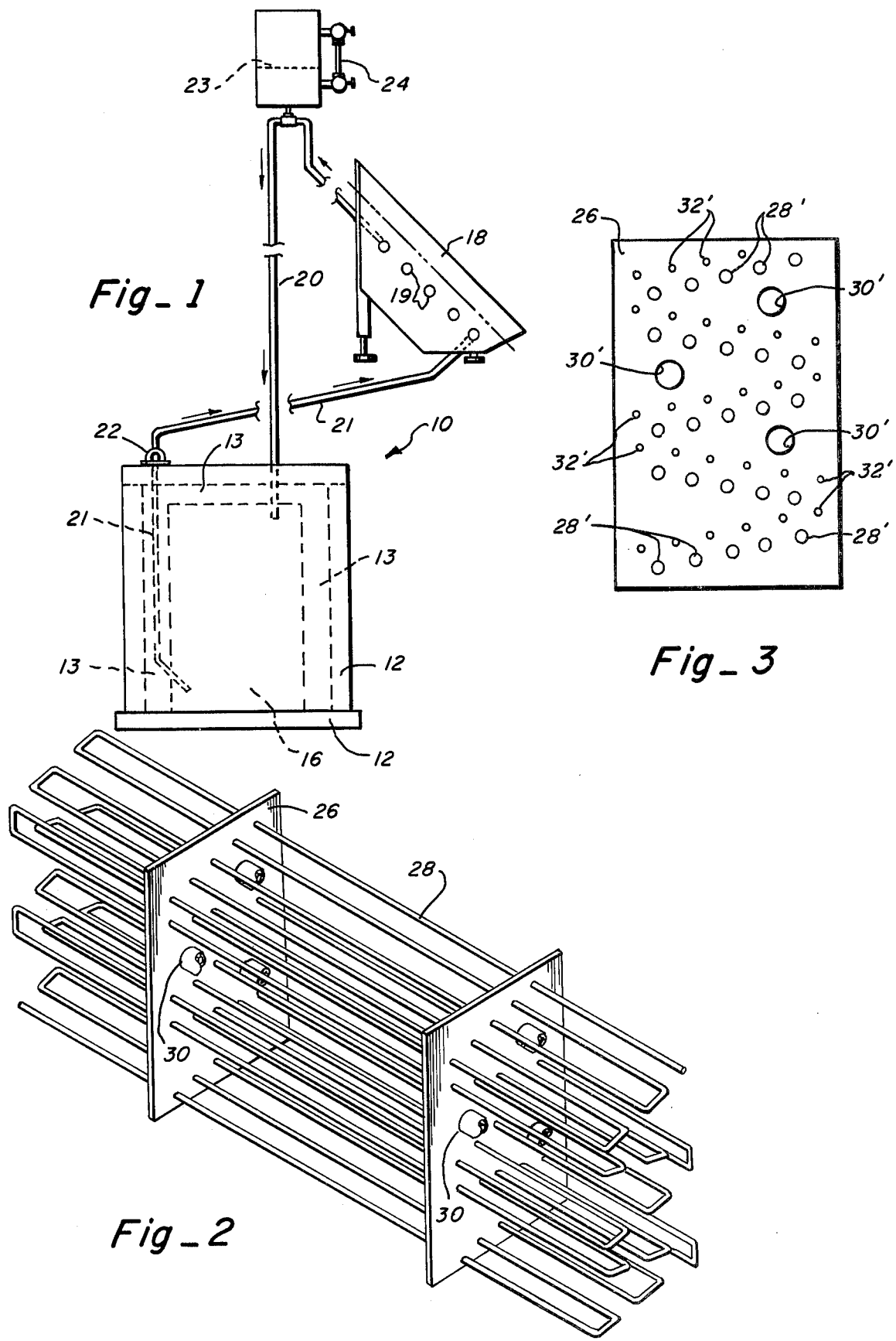

HEAT STORAGE VAULT

BACKGROUND OF THE INVENTION

This application is a division of application Serial No. 572,083, filed Apr. 28, 1975, U.S. Pat. No. 4,064,865.

This invention relates generally to a heat storage vault, and more particularly to a heat storage apparatus in which a plurality of serpentine pipes are positioned within an insulated enclosure, the pipes being equidistantly spaced from one another and from lengths of a common pipe and surrounded by a heat storage medium.

In providing energy to heat buildings, water and other such conventional uses of heat energy, it is often true that energy is available or more economically produced at times other than when demand for such energy exists. For instance, solar energy is available during the daytime in such abundance that a dwelling is readily heated, or over-heated without provision for solar collectors. However, at night energy availability commonly drops creating a greater demand for heat. Similarly, electrical energy which may be converted to heat is more economically available during certain off peak demand periods. Accordingly, heat storage means are commonly provided, particularly in conjunction with the use of solar collectors. Often these take the "pile of rocks" form in which air is circulated through voids between a collection of rocks. Similarly, a large tank of water, salts or other such conventional heat storage mediums, may be employed as the heat storage device.

A heat storage vault such as that designed specifically for solar energy involves requirements and structures distinct from that of a classical heat exchanger. In general, a number of tubes, usually supplied in parallel from two fluid streams, are positioned adjacent one another to promote heat flow from fluid in one set of tubes to the fluid in the other set of tubes. Under certain conditions, a thermal mass is provided to stabilize the temperature fluctuations within a predetermined range. U.S. Letters Pat. No. 3,401,682, issued Sept. 17, 1968 is an example of such a regenerative heat exchanger particularly adapted for use under cryogenic conditions. However, the purpose of this device is not to homogenously store substantial amounts of heat and provide for even withdrawal of the heat by one or more systems requiring such heat, but rather to facilitate heat transfer from one fluid to another under a stabilizing thermal mass.

SUMMARY OF THE INVENTION

The present invention, which provides a heretofore unavailable improvement over previous heat storage vaults comprises a vault either intrinsically insulated or with additional insulation housing a plurality of serpentine pipes equidistantly spaced along the lengths thereof and immersed in a heat storage medium. The arrangement and spacing of the vault, which will be more specifically described below with reference to the drawings, provides for even input of heat from one of the serpentine pipes thus facilitating storage of substantial amounts of heat, from, for instance, a solar collector. Similarly, at least one of the other serpentine pipes provides for an even withdrawal of heat from the heat storage medium. In addition to equal distribution of heat, the heat storage device provides for ease of assembly and installation and is amenable to mass production. Of particular concern is the instance in which at least three serpentine pipes are provided thus enabling heat to be withdrawn from two independent systems, at all times maintaining the even withdrawal of heat from the heat storage medium.

BRIEF DESCRIPTION OF THE DRAWINGS

In the drawings:

FIG. 1 is a simplified side view of a heat vault in accordance with the instant invention interconnected with a solar collection system.

FIG. 2 is a perspective view of the serpentine pipe assembly in accord with the instant invention.

FIG. 3 is a view of a complete spacer plate in accord with the instant invention.

DETAILED DESCRIPTION OF THE INVENTION

Turning now to the drawings, wherein like components are designated by like reference numerals throughout the various figures, a heat storage vault in accord with the instant invention is shown in FIG. 1 and generally designated 10. Heat vault 10 as shown in simplified form in FIG. 1, includes vault walls 12 which provide a strong substantially sealed enclosure for vault 10, insulation 13, which may be separate as illustrated, or if properly chosen be integral with vault wall 12, and internal void 16 filled with a heat storage medium. Heat storage mediums are of course well known and preferably have relatively high thermal conductivity and specific heat. Conventional heat storage mediums, either liquid, solid, or involving a phase change from liquid to solid may be employed.

Heat storage vault 12 is preferably connected to solar collector 18 which concentrates radiant energy on pipes 19 which in turn communicate through conduit 20 with heat storage vault. Return pipe 21, depending on the orientation and availability of a thermal siphon, may advantageously employ circulating pump 22. A header tank 23 having sight tube 24 may be advantageously employed to ensure that the system is filled with liquid and allow for expansion.

The serpentine pipe arrangement disposed within void 16 containing heat storage media is partially illustrated at FIG. 2. Spacer plates 26 having serpentine pipes 28 and 30 (pipe 30 being only partially shown for clarity) serve to space and locate serpentine pipes 28 and 30. It should be noted that serpentine pipes 28 and 30, fully illustrated as serpentine pipe 28, is formed of a number of straight lengths connected by 180° bends at the ends thereof. This permits a single serpentine pipe to expose a great length thereof to the heat storage media in a compact enclosure 12.

The nature of a more preferred arrangement, not shown in completeness in FIG. 2 for purposes of clarity, will be apparent with reference to FIG. 3 wherein spacer plate 26 includes properly spaced holes for three serpentine pipes. Holes 28' and 30' are provided to accomodate serpentine pipes 28 and 30, as shown in FIG. 2. In addition, holes 32' are dated to show the spacing of yet another serpentine pipe not shown in FIG. 2 but basically of a similar configuration to that of serpentine pipe 28. It will be noted that holes 28', 30', and 32' are substantially equally spaced from adjacent lengths of a common pipe or other pipes positioned within the heat storage medium. Accordingly, a great deal of heat may be evenly distributed by, for instance, serpentine pipe 28. The serpentine pipes which would be positioned through holes 28' and 32' may independently withdraw heat from the heat storage medium in a thermally homogeneous fashion.

In summary, the heat storage vault of the instant invention provides for even investment or withdrawal of substantial amounts of heat energy in a heat storage medium. In a preferred embodiment the heat may be withdrawn independently from separate serpentine pipes. Accordingly, substantial amounts of heat energy may be conveniently and efficiently stored during the time of, for instance, excess availability of solar energy, and evenly withdrawn at other times when heat demands are greater than the supply of solar energy.

Although only illustrative figures and examples of the instant invention have been presented and discussed, many variations of the invention will be apparent to those skilled in the art, and such variations tend to be within the scope of the invention as defined by the following claims.

What is claimed is:

1. A heat storage vault, comprising:
   an insulated enclosure of fixed dimensions;
   a plurality of independent, serpentine pipes each being isolated from the other serpentine pipes and each having substantially linear lengths extending back and forth within the enclosure with the lengths thereof substantially equidistantly spaced both from the closest length of the same pipe and equidistantly spaced from each closest length of each of the other independent serpentine pipes; and
   a heat storage medium filling the enclosure and the space between the serpentine pipe lengths;
   whereby substantial amounts of heat energy may be invested in the heat storage medium by one of the serpentine pipes and heat energy may be withdrawn from the heat storage medium by at least one other of the serpentine pipes.

2. A heat storage vault as set forth in claim 1 in which at least one of the serpentine pipes is connected to a substantially closed loop with a heat energy source.

3. A heat storage vault as set forth in claim 1 in which at least one of the serpentine pipes is connected to a solar energy collector.

* * * * *